(12) United States Patent
Lowrey et al.

(10) Patent No.: US 8,055,403 B2
(45) Date of Patent: Nov. 8, 2011

(54) PERIPHERAL ACCESS DEVICES AND SENSORS FOR USE WITH VEHICLE TELEMATICS DEVICES AND SYSTEMS

(75) Inventors: Larkin H. Lowrey, La Jolla, CA (US); Diego A. Borrego, San Diego, CA (US); Alan Wettig, San Diego, CA (US); Bruce Davis Lightner, La Jolla, CA (US); Matthew J. Banet, Del Mar, CA (US); Paul Washicko, Carlsbad, CA (US); Eric C. Berkobin, Woodstock, GA (US); Charles M. Link, II, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 0 days.

(21) Appl. No.: 13/014,635

(22) Filed: Jan. 26, 2011

(65) Prior Publication Data

US 2011/0118934 A1 May 19, 2011

Related U.S. Application Data

(63) Continuation of application No. 11/796,372, filed on Apr. 27, 2007, now Pat. No. 7,904,219, which is a continuation-in-part of application No. 10/810,373, filed on Mar. 26, 2004, now Pat. No. 7,228,211, which is a continuation-in-part of application No. 10/431,947, filed on May 8, 2003, now Pat. No. 6,957,133, and a continuation-in-part of application No. 10/447,713, filed on May 29, 2003, now Pat. No. 6,732,031, which is a continuation of application No. 09/776,106, filed on Feb. 1, 2001, now Pat. No. 6,636,790.

(60) Provisional application No. 60/220,986, filed on Jul. 25, 2000, provisional application No. 60/222,213, filed on Aug. 1, 2000, provisional application No. 60/222,152, filed on Aug. 1, 2000.

(51) Int. Cl.
*G06F 19/00* (2006.01)
(52) U.S. Cl. .............................. 701/33; 701/29
(58) Field of Classification Search ................ 701/29, 701/33, 36; 702/182–185
See application file for complete search history.

(56) References Cited

U.S. PATENT DOCUMENTS 7,103,460 B1 * 9/2006 Breed ............................ 701/29

* cited by examiner

*Primary Examiner* — Yonel Beaulieu
(74) *Attorney, Agent, or Firm* — John L. Doughty

(57) ABSTRACT

A telematics method and system includes, and uses, a telematics device with a controller in communication with a diagnostic system configured to receive diagnostic information from a host vehicle; a position-locating system configured to determine location information of the host vehicle; a wireless transceiver configured to transmit and receive information through a wireless network to and from at least one Internet-accessible website; and, a communication interface including at least a short range wireless interface link. The telematics device may be embodied in an access device, which may include the position-locating system. The access device may be a smartphone, or similar device, that retrieves/transmits diagnostic data/information, and other data/information to/from the vehicle via the short range wireless link. The access device performs various telematics device functions; it uses a long range wireless interface to communicate diagnostic and related information to a central host computer, and to receive related information from same.

20 Claims, 12 Drawing Sheets

| Diagnostics | Mapping | Service Records | Text Messaging |

*Found 12 service record(s). Click the Invoice Date or Work Order*

| Invoice Date ▼ | Work Order # | Company |
|---|---|---|
| 11/10/03 | 209729 | Honda of El Cerrito Service |
| 08/22/03 | 202431 | Honda of El Cerrito Service |
| 08/21/03 | 199734 | Honda of El Cerrito Service |
| 03/15/03 | 189065 | Honda of El Cerrito Service |
| 02/03/03 | 185346 | Honda of El Cerrito Service |
| 11/06/02 | 177232 | Honda of El Cerrito Service |
| 09/06/02 | 171184 | Honda of El Cerrito Service |
| 07/09/02 | 165170 | Honda of El Cerrito Service |
| 05/17/02 | 161760 | Honda of El Cerrito Service |
| 04/30/02 | 158293 | Honda of El Cerrito Service |
| 03/28/02 | 155340 | Honda of El Cerrito Service |
| 03/22/02 | 154370 | Honda of El Cerrito Service |

Service Record

Work Order ID: 209729
Invoice Date: 11/09/03
Service Advisor Name & Number: PAUL FORTE (19)
Mileage: 38143
Repair Cost: 386.07

| # | Job Pay Type | Operation | Technician ID |
|---|---|---|---|
| 1 | Customer | 01HOZ-37500 - 37500 MILE SERVICE | 33 |
|   | Comments: CUSTOMER REQUESTS 37,500 MILE SERVICE ESTIMATE INCLUDES HAZARDOUS WASTE CHARGE, RECOMMENDED MAINTENANCE ; PERFORMED 37,500 MILE SERVICE | | |
| 2 | Customer | 30HOZ-FRZPDRTR - FRONT PADS/ROTORS | 33 |
|   | Comments: NEEDS FRONT BRAKES ; DUE TO NORMAL WEAR; REPLACED FRONT BRAKE PADS AND RESURFACED BOTH FRONT ROTORS | | |

Fig. 8

PERIPHERAL ACCESS DEVICES AND SENSORS FOR USE WITH VEHICLE TELEMATICS DEVICES AND SYSTEMS

CROSS REFERENCE TO RELATED APPLICATIONS/PRIORITY CLAIM

This application is a continuing application of, and claims priority under 35 U.S.C. §120 to, U.S. patent application Ser. No. 11/796,372, filed Apr. 27, 2007, now issued as U.S. Pat. No. 7,904,219, which is a continuation-in-part of prior U.S. patent application Ser. No. 10/810,373, now issued as U.S. Pat. No. 7,228,211, filed Mar. 26, 2004, which is (1) a continuation-in-part of prior U.S. patent application Ser. No. 10/431,947, filed May 8, 2003, now issued as U.S. Pat. No. 6,957,133; and (2) a continuation-in-part of prior U.S. patent application Ser. No. 10/447,713, filed May 29, 2003, now issued as U.S. Pat. No. 6,732,031, which is a continuation of prior U.S. patent application Ser. No. 09/776,106, filed Feb. 1, 2001, now issued as U.S. Pat. No. 6,636,790, which claims the benefit of U.S. Provisional Application No. 60/220,986, filed Jul. 25, 2000, U.S. Provisional Application No. 60/222,213, filed Aug. 1, 2000 and U.S. Provisional Application No. 60/222,152, filed Aug. 1, 2000. The contents of the above-listed applications, and patents, are incorporated herein by reference in their entireties.

FIELD

The invention is generally related to vehicle telematics. In various embodiments, the invention more particularly relates to peripheral access devices operatively associated with vehicle telematics devices and systems to perform many different functions.

BACKGROUND

Vehicles, such as light-duty cars and trucks and heavy-duty tractor/trailers, can include "telematics" systems that monitor information describing the vehicle's location and diagnostic conditions. Such telematics systems typically include a conventional global positioning system ("GPS") that receives signals from orbiting satellites and a processor that analyzes these signals to calculate a GPS "fix". The fix, which features data such as the vehicle's latitude, longitude, altitude, heading, and velocity, typically describes the vehicle's location with an accuracy of about 10 meters or better.

Telematics systems can include circuitry that monitors the host vehicle's diagnostic system. As an example of a diagnostic system, light-duty automobiles and trucks beginning with model year 1996 include an on-board diagnostic (OBD-II) system as mandated by the Environmental Protection Agency (EPA). OBD-II systems typically operate under one of the following communication protocols: J1850 VPW (Ford); J1850 VPWM (General Motors); ISO 9141-2 (most Japanese and European vehicles); Keyword 2000 (some Mercedes and Hyundai vehicles); and CAN (a newer protocol used by many vehicles manufactured after 2004). OBD-II systems monitor the vehicle's electrical, mechanical, and emissions systems and generate data that are processed by a vehicle's engine control unit (ECU) to detect malfunctions or deterioration in performance. The data typically include parameters such as vehicle speed (VSS), engine speed (RPM), engine load (LOAD), and mass air flow (MAF). The ECU can also generate diagnostic trouble codes (DTCs), which are 5-digit codes (e.g., "P0001") indicating electrical or mechanical problems with the vehicle. Most vehicles manufactured after 1996 include a standardized, serial 16-cavity connector (sometimes referred to herein as an "OBD-II connector") that makes these data available. The OBD-II connector serially communicates with the vehicle's ECU and typically lies underneath the vehicle's dashboard.

Heavy-duty trucks typically include a diagnostic system, referred to herein as a "truck diagnostic system", which is analogous to the OBD-II systems present in light-duty vehicles. Truck diagnostic systems typically operate a communication protocol called J1708/J1587 or J1939 that collects diagnostic information from sensors distributed in the truck, processes this information, and then makes it available through a 6 or 9-pin connector, referred to herein as a "truck diagnostic connector", which is usually located in the truck's interior.

BRIEF DESCRIPTION OF DRAWINGS

The utility of the embodiments of the invention will be readily appreciated and understood from consideration of the following description when viewed in connection with the accompanying drawings, wherein:

FIG. 8 is a semi-schematic drawing of an Internet-accessible web page that links to the web site of FIG. 5A and displays a vehicle's service records generated using a data management system for an automotive dealership, according to one embodiment of the present invention.

DESCRIPTION

Figure 1:
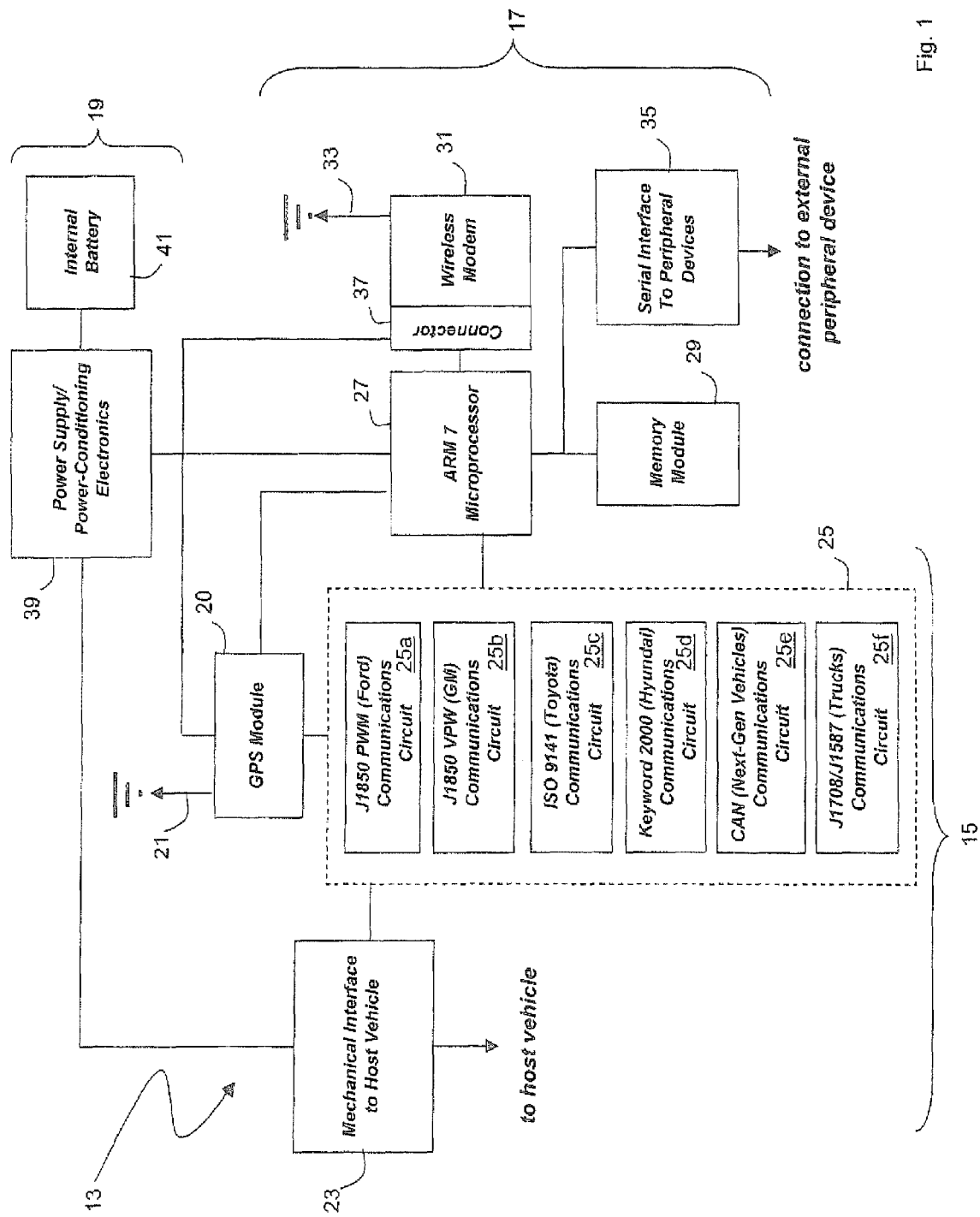
FIG. 1 is a schematic drawing of an in-vehicle telematics device featuring a wireless modem, GPS, vehicle-communication circuits, and a serial interface for connecting one or more peripheral devices, according to one embodiment of the invention.

It is an object of an embodiment of the invention to provide a small-scale, wireless, internet-based telematics system for monitoring and analyzing a vehicle's GPS and diagnostic data. The embodiment of the system includes an in-vehicle telematics device that features a serial interface to one or more peripheral devices, including but not limited to the following: 1) liquid-crystal display (LCD) and keyboard; (2) hands-free cellular telephone kit; 3) panic button; 4) short-range wireless transmitter (e.g., a Bluetooth® or 802.11b transmitter); and 5) a secondary modem (e.g. a satellite modem). In the embodiment, the peripheral devices, which may connect through the serial interface using a universal connector, for example, expand the capabilities of the telematics device to include, among other things, text messaging between a driver and a fleet manager; operation of a cellular telephone in a convenient "hands free" mode; notification of authorities in case of emergency; short-range, high-speed data communication; and world-wide wireless coverage. Embodiments of the invention also provide various access devices and sensors as peripheral devices that operatively interact with in-vehicle telematics systems and devices to perform various functions.

More specifically, in one embodiment, the invention provides an in-vehicle telematics system featuring: 1) a controller; 2) a diagnostic system configured to receive diagnostic information from a host vehicle; 3) a position-locating system configured to determine the host vehicle's location information; 4) a communication interface configured to send additional information to a peripheral system other than the diagnostic position-locating systems; and, 5) a wireless transmitter configured to transmit information through a wireless network to an Internet-accessible website.

In certain embodiments, the peripheral device can be a display, such as an LCD. In this case the controller features machine-readable computer code, e.g., firmware, which controls the display. For example, the computer code can be configured to render a text message on the display. The text message can be sent from the Internet-accessible website, or from a cellular telephone or a personal digital assistant ("PDA"). Preferably the display is configured to mount inside the vehicle. In various embodiments, the peripheral device may include a graphics display.

In other embodiments, the peripheral device features a voice interface that receives audio information and sends the information to the wireless transmitter. For example, the peripheral device can be a hands-free phone kit. The hands-free phone kit can contain a Bluetooth® transmitter configured to send information to and receive information from a user's cellular telephone. Alternatively, the telematics device includes the Bluetooth® transmitter, e.g. it is mounted on an internal circuit board. In still other embodiments, the peripheral device is a short-range wireless transmitter, e.g. a transmitter operating a Bluetooth®, 802.11, part-15, or infrared wireless protocol.

In another embodiment, the peripheral device includes a button (e.g. a "panic button") that, when depressed, sends a signal through the interface to the controller. Or the peripheral device can be a secondary wireless modem, such as a satellite modem. The interface used in the telematics device may be a serial interface, such as an I²C, RS232, RS422, RS485, USB, CAN or SPI serial interface.

In an embodiment, the position-locating system may be a conventional GPS (that interprets satellite signals to determine location) or a network-assisted GPS (that interprets both satellite and terrestrial wireless signals to determine location). The controller may be a microcontroller or a microprocessor, e.g., an ARM7 or ARM9 microprocessor.

In another embodiment, the invention provides an in-vehicle telematics system that features a controller that runs machine-readable computer code configured to receive diagnostic information from a host vehicle and location information from a position-locating system. The controller is additionally configured to receive and send information through a serial interface to a peripheral device other than the diagnostic and position-locating systems. The telematics system uses a wireless transmitter to transmit diagnostic and location information through a wireless network to an Internet-accessible website.

In another embodiment, the invention provides an in-vehicle telematics system that features the above-described components for determining diagnostic and location information combined with a voice interface configured to receive and transmit voice information.

In various embodiments, the same wireless transmitter transmits location information through a wireless network to the Internet-accessible website, and voice information through the same wireless network to an external telephone. Here, the controller further comprises a speech-recognition module, e.g., machine-readable computer code that analyzes a user's speech to determine a telephone number and other commands.

In another embodiment of the invention, the telematics system features a housing that covers the controller and the position-location system, and additionally includes a port that connects to the external peripheral system. In this case, the system can include a cable or a wireless interface that sends information to and receives information from the external peripheral system.

In yet another embodiment of the invention, the invention provides a telematics system that features a short-range wireless transmitter (e.g. a Bluetooth® transmitter) configured to send information to an external peripheral device, and a long-range wireless transmitter (e.g. a cellular modem) configured to transmit information through a wireless network to an Internet-accessible website. The external peripheral device may include a smartphone that has the short-range wireless interface for communicating with the vehicle for retrieving diagnostic information therefrom and for transmitting vehicle commands thereto. The short-range wireless device may be Bluetooth® or Wi-Fi, or other similar technologies. The smart-phone may also include the long-range wireless modem for communicating information and data to a remote host computer. Thus, the smartphone, or similar device, embodies the telematics device functionality, as well as communication capabilities, and transmits and receives vehicle information and data (diagnostic, derived, and other vehicle data and information) to and from the vehicle it is communication with over the short-range wireless communication link. The smartphone device also preferable includes a GPS circuit for position determination purposes. However, to preserve battery life in the smartphone, the telematics device smartphone may use location information transmitted over the short-range wireless link from a separate GPS circuit/device, which receives power from the vehicle.

Various embodiments of the invention have many advantages. In particular, with various embodiments of the invention described herein, different peripheral devices can easily and quickly connect to the telematics device through its serial interface. This means a user can add valuable functionality to the telematics device, and optimize the device for a particular application, in a matter of minutes. For example, using the serial interface, the user can add a simple, LCD display and keyboard. With this, drivers and fleet managers can communicate with text messages to optimize the fleet's efficiency. Or a hands-free cellular telephone kit (e.g., a kit featuring a Bluetooth® module or cradle) can connect through the serial interface to give a driver a safe, convenient way to place cellular phone calls. To even further enhance safety and security, a peripheral device featuring a panic button can connect through the serial interface. Depressing the panic button automatically sends a message to, e.g., a call center, that in turn would notify the appropriate authorities. Peripheral devices running a Bluetooth® or 802.11b wireless protocol can quickly send large amounts of information (e.g., diagnostic information collected and stored over long periods of time) to a proximal hub. And a peripheral device featuring a secondary modem, such as a satellite, GSM/GPRS or CDMA modem, can transmit and receive information in regions in which the primary modem may not operate.

These features, made possible by the serial interface, complement basic advantages provided by the telematics system. For example, embodiments of this system provide wireless, real-time transmission and analysis of GPS and diagnostic data, followed by analysis and display of these data using an Internet-hosted web site. This makes it possible to characterize the vehicle's performance and determine its location in real-time from virtually any location that has Internet access, provided the vehicle being tested includes the below-described telematics system. This information is complementary and, when analyzed together, can improve conventional services such as roadside assistance, vehicle theft notification and recovery, and remote diagnostics. For example, the information can indicate a vehicle's location, its fuel level and battery voltage, and whether or not it has any active DTCs. Using this information, a call center can dispatch a tow truck with the appropriate materials (e.g., extra gasoline or tools required to repair a specific problem) to repair the vehicle accordingly.

Embodiments of the present invention may be useful in a wide range of vehicles. Examples of such vehicles include automobiles and trucks, as well as commercial equipment, medium and heavy-duty trucks, construction vehicles (e.g., front-end loaders, bulldozers, forklifts), powered sport vehicles (e.g., motorboats, motorcycles, all-terrain vehicles, snowmobiles, jet skis, and other powered sport vehicles), collision repair vehicles, marine vehicles, and recreational vehicles. Further, embodiments may be useful in the vehicle care industry.

Figure 2:
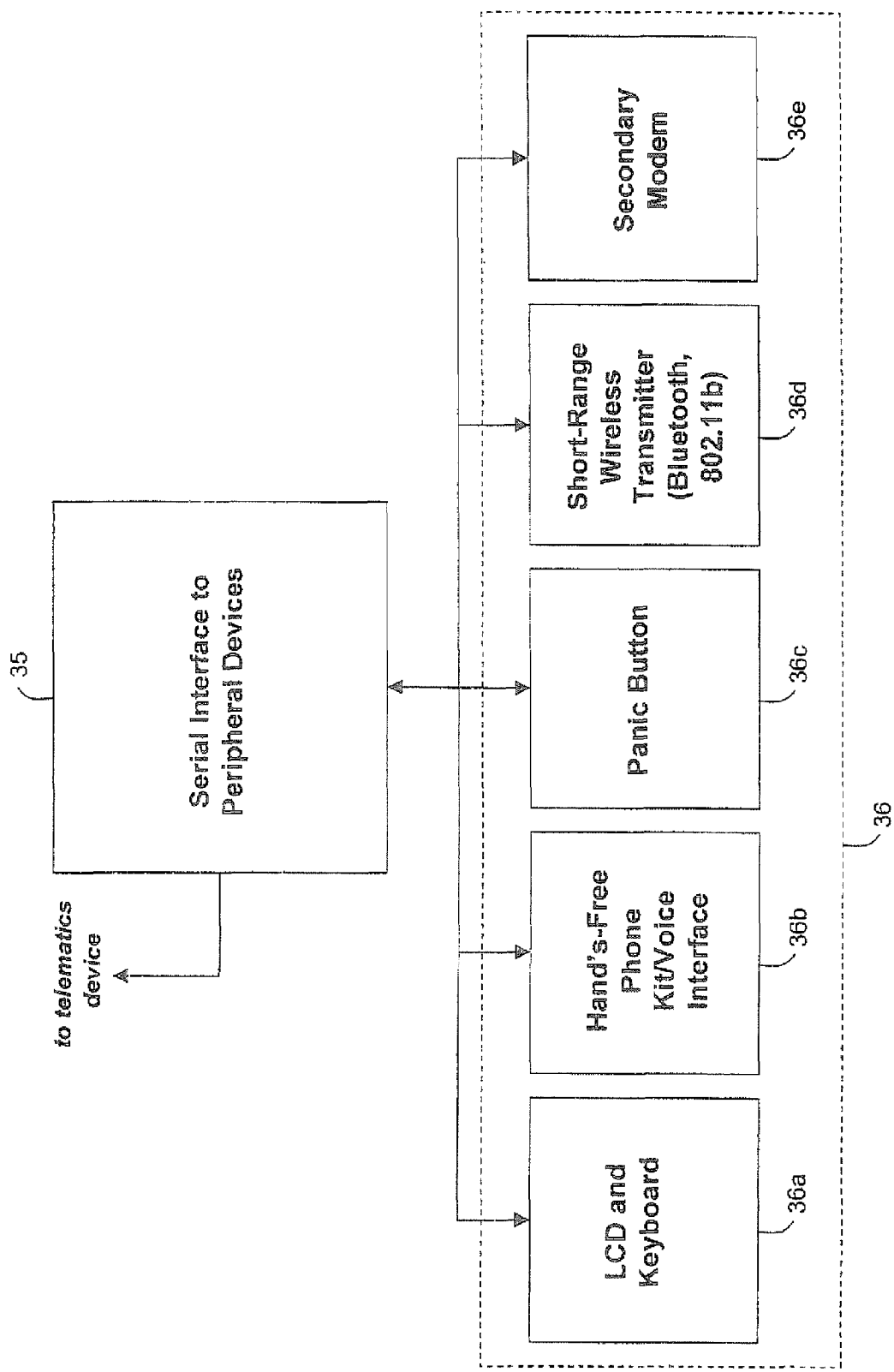
FIG. 2 is a schematic drawing of the serial interface of FIG. 1 connecting to peripheral devices including an LCD display and keyboard, a hands-free cellular phone kit, a panic button, a short-range wireless transmitter, and a secondary modem, according to one embodiment of the invention.

FIGS. 1 and 2 show schematic drawings of a small-scale telematics device 13 according to an embodiment of the invention that monitors diagnostic and location-based data from a host vehicle and wirelessly transmits these data to an Internet-accessible website. The telematics device 13 features a serial interface 35 that connects to peripheral devices, described in detail below. The serial interface 35 features a connector that mates with an associated connector that is universal to each peripheral device. The telematics device 13 runs firmware, described in more detail below, that recognizes the peripheral device and serially communicates with it so that information can pass across the serial interface 35. The serial interface 35 additionally supplies power and ground so that the peripheral device does not require an additional power supply to operate.

Referring to FIG. 2, for example, peripheral devices according to an embodiment of the invention may include: 1) LCD and keyboard 36a for sending, receiving, and displaying text messages; 2) a hands-free cellular phone kit and voice interface 36b for safe, convenient voice communications; 3) a panic button 36c for sending a short, automated message and location in case of emergency; 4) a short-range, high-bandwidth wireless transmitter 36d operating "Bluetooth®" or 802.11b technology; or 5) a secondary modem 36e, e.g., a cellular or satellite modem.

In addition to the serial interface to peripheral devices 35, the telematics device 13 may feature: 1) a data-generating portion 15 that generates both diagnostic and location-based data; 2) a data-processing portion 17 that processes and wirelessly transmits information; and 3) a power-management portion 19 that supplies power to each circuit element in the device 13.

The circuit elements in each portion 15, 17, 19 may be integrated into small-scale, silicon-based microelectronic devices (e.g., ASICs). This means the entire telematics device 13 may be incorporated into a single "chip set", described by a reference design, thereby reducing its size, manufacturing cost, and potential post-installation failures.

The data-generating portion 15 may feature a GPS module 20 that receives wireless signals from orbiting GPS satellites through an integrated GPS antenna 21. Once the antenna 21 receives signals from at least three satellites, the GPS module 20 processes them to calculate a GPS "fix" that includes the host vehicle's location-based data, e.g. latitude, longitude, altitude, heading, and velocity. The GPS module 20 calculates location-based data at a programmable interval, e.g., every minute.

The data-generating portion 15 may communicate with the host vehicle through an electrical/mechanical interface 23 that connects to the vehicle's diagnostic connector. As described above, for light-duty vehicles, this connector is an EPA-mandated 16-cavity connector, referred to herein as the OBD-II connector. For heavy-duty trucks, this connector is either a 6 or 9-pin connector, referred to herein as the truck diagnostic connector.

The OBD-II or truck diagnostic connector, may be located underneath the vehicle's steering column, provides direct access to diagnostic data stored in memory in the vehicle's ECU. The entire vehicle-communication circuit 25 manages communication through the electrical/mechanical interface 23 with separate modules 25a-25c for different vehicle buses (e.g., those featured in Ford, GM, Toyota, and heavy-duty trucks). Each module 25a-25e is a separate circuit within the vehicle-communication circuit 25. These circuits, for example, can be integrated into an application-specific integrated circuit (ASIC), or can be included as discrete circuits processed on a printed circuit board.

The vehicle-communication circuit additionally may include logic that detects the communication protocol of the host vehicle, and then selects this protocol to communicate with the vehicle. Once the protocol is selected, the electrical/ mechanical interface 23 receives diagnostic data from the vehicle according to a serial protocol dictated by the appropriate vehicle-communication circuit 25. The electrical/mechanical interface 23 passes this information to the data-processing portion 17 for analysis and wireless transmission.

The data-processing portion 17 may feature a 16-bit ARM7 microprocessor 27 that manages communication with each external peripheral device, along with the different elements of the data-generating portion 15. For a peripheral device featuring an LCD display and keyboard, for example, the microprocessor runs firmware that receives and processes an incoming text message, and then displays this text message on the LCD. Conversely, the microprocessor 27 interprets keystrokes from the keyboard, formulates these into a message, and transmits the message through a wireless network, as described in more detail below.

The microprocessor 27 additionally receives and processes diagnostic information from the data-communication circuit 25 and location-based information from the GPS module 20. For example, the microprocessor 27 can process diagnostic data describing the host vehicle's speed, mass air flow, and malfunction indicator light to calculate, respectively, an odometer reading, fuel efficiency, and emission status. These calculations are described in more detail in patent applications entitled "Internet-Based Method for Determining a Vehicle's Fuel Efficiency" (U.S. Pat. No. 6,594,579) and "Wireless Diagnostic System for Characterizing a Vehicle's Exhaust Emissions" (U.S. Pat. No. 6,604,033), the contents of which are incorporated herein by reference.

The microprocessor 27 may store firmware, pre-processed diagnostic data, and/or post-processed diagnostic data in a memory module 29. The memory module 29 also stores a file-managing operating system (e.g., Linux) that runs on the microprocessor 27. During operation, the memory module 29 can additionally function as a "data logger" where both diagnostic and location-based data are captured at high rates (e.g., every 200 milliseconds) and then read out at a later time.

With firmware the microprocessor 27 formats information into unique packets and serially transfers these packets to a wireless modem 31. Each formatted packet includes, e.g., a header that describes its destination and the wireless modem's numerical identity (e.g., its "phone number") and a payload that includes the information. For example, the packets can include diagnostic or location information, a text message, a short message generated from a panic button that indicates a problem with the user or vehicle. The wireless modem 31 operates on a wireless network (e.g., CDMA, GSM, GPRS, Mobitex, DataTac, ORBCOMM) and transmits the packets through an antenna 33 to the network. The antenna 33 can be an external antenna, or can be embedded into a circuit board or mechanical housing that supports the wireless modem 31. Once transmitted, the packets propagate through the network, which delivers them to an Internet-accessible website, as described in more detail with reference to FIG. 5. In various embodiments, the wireless modem 31 may include or be operatively associated with a wireless transceiver for transmitting or receiving communicated data or other information to/from a given telematics device or system.

The power-management portion 19 of the wireless appliance 13 features a power supply and power-conditioning electronics 39 that receive power from the electrical/mechanical interface 23 and, in turn, supply regulated DC power to circuit elements in the data-generating 15 and data-processing 17 portions, and through the serial interface 35 to the connected peripheral device. In this application, the power-management portion may switch 12 to 14 volts from the vehicle's battery to a lower voltage, e.g., 3.3 to 5 volts, to power the circuit elements and the connected peripheral device. The mechanical interface 23, in turn, attaches to the host vehicle's diagnostic connector, which receives power directly from the vehicle's standard 12-volt battery. An internal battery 41 connects to the power supply and power-conditioning electronics 39 and supplies power in case the telematics device is disconnected from the vehicle's power-supplying diagnostic connector. Additionally, the power supply and power-conditioning electronics 39 continually recharge the internal battery 41 so that it can supply back-up power even after extended use.

FIG. 2 is a schematic drawing of an embodiment that shows the serial interface 35 connected to a variety of peripheral devices 36*a-e*. Table 1 describes some of the possible peripheral devices 36*a-e*, the corresponding parameters that are received or transmitted through the serial interface, and the potential applications of these devices. The serial interface supplies power and ground to each peripheral device. For some devices, such as for a hands-free phone kit, these are the only parameters supplied by the serial interface. In this case, the phone kit connects to a user's cellular telephone, which in turn transmits and receives voice calls. In other cases, such as for the LCD and keyboard and secondary modem, the serial interface additionally supplies and receives information (e.g., diagnostic or location information, text messages).

Table 1 is not meant to be exhaustive, and thus peripheral devices not described therein may also connect to the telematics device.

| Device | Transmitted/Received Serial Information | Application |
| --- | --- | --- |
| LCD and keyboard | location, diagnostics, text messages | fleet management |
| hands-free cellular phone kit | none | voice calls |
| panic button | location, diagnostics, bit stream | vehicle emergency |
| high-bandwidth short-range transmitter | location, diagnostics, text messages | vehicle repair; data mining |
| secondary modem | location, diagnostics, text messages | fleet management; stolen-vehicle recovery; diagnostics |

As shown, Table 1 includes examples of various peripheral devices, the parameters they receive or transmit through the serial interface, and their potential applications.

Each of the peripheral devices 36*a-e* listed in Table 1 may connect to the telematics device using a standard, 4-pin connector attached to a cable. The connector and cable are designed so to be uniform so that any device that transmits or receives information can connect to and operate with the telematics device. As described above, the pins in the connector supply power, ground, and a serial communication interface that passes information between the telematics device and the peripheral device. The serial interface 35 is controlled by a microprocessor (e.g., an ARM 7 shown in FIG. 1) operating within the telematics device. The ARM 7 runs firmware that recognizes the connected peripheral device, as described in more detail below, and subsequently powers up and begins communicating with the device upon installation.

The serial link for connecting peripheral devices to the serial interface 35 may be a conventional I$^2$C bus connected through a 4-pin connection. I$^2$C is a 2-wire, synchronous serial communication interface developed by Phillips Semiconductor. With this interface, two wires, serial data (SDA) and serial clock (SCL), carry information between the peripheral device and the telematics device. According to $I^2C$, each byte of information put on the SDA line must be 8-bits long, but the number of bytes transmitted per transfer is unrestricted. Using $I^2C$, the peripheral device can operate as either a transmitter or receiver. The ARM7 microprocessor controls this connection with an $I^2C$ transceiver that may be integrated into its circuitry.

Both SDA and SCL are bi-directional lines and connect to a positive supply voltage through a pull-up resistor (which may be between 4.7 k and 10 k). When the bus is free, both lines are high. Each peripheral device connected through $I^2C$ provides a unique address (generated by, e.g., an EEPROM, RTC or I/O expander) that is recognized by the telematics device. This means, following installation, the telematics device can recognize the attached peripheral device and begin operation without any input from the installer. $I^2C$ is described in more detail in "$I^2C$-bus specification and user manual," document number UM10204_rev. 3, released Jun. 19, 2007, by NXP B.V., the contents of which are incorporated herein by reference.

Figure 3:
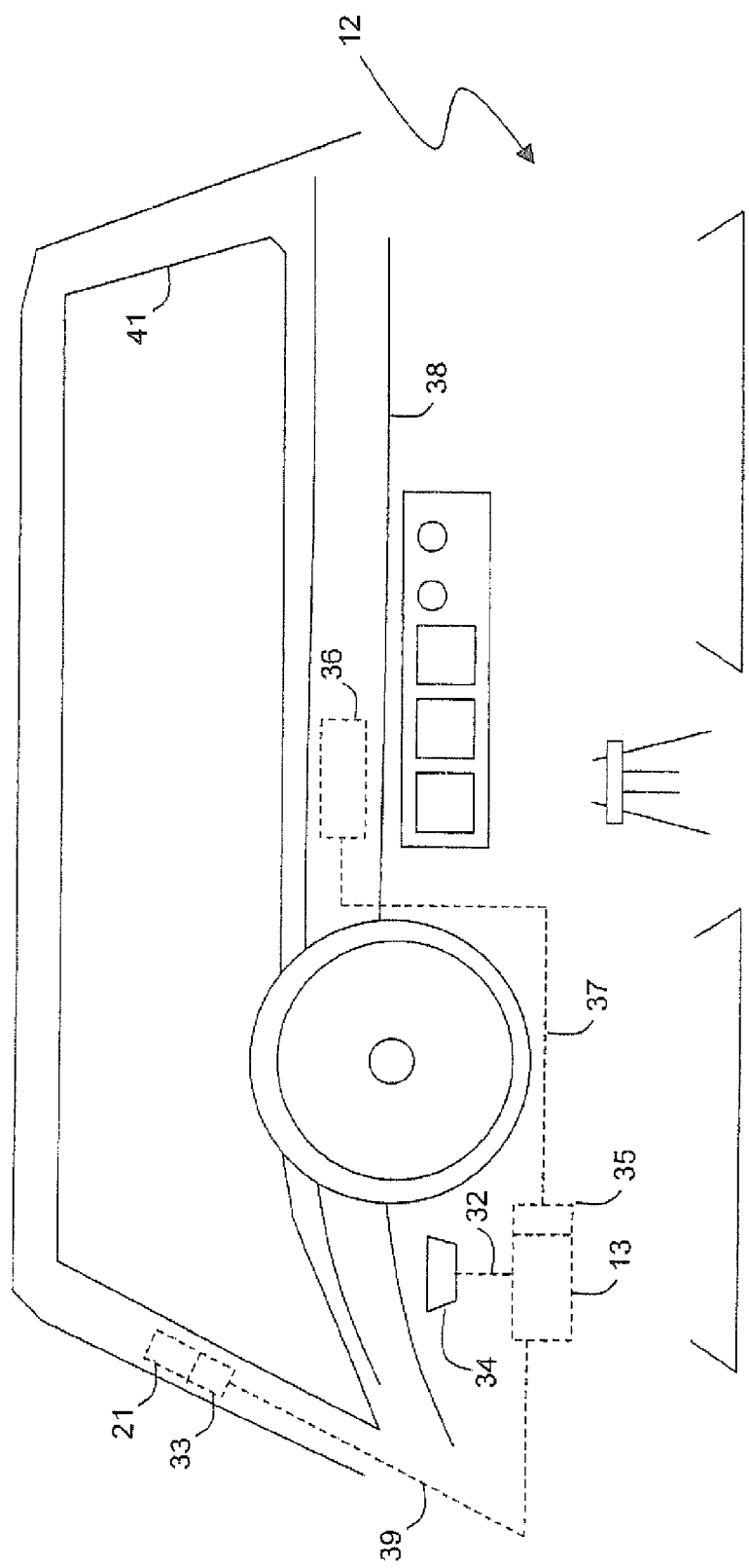
FIG. 3 is a semi-schematic drawing of a vehicle's driver and passenger compartments, featuring an in-vehicle telematics device and a peripheral device, according to one embodiment of the invention.

FIG. 3 of an embodiment shows a schematic drawing of a vehicle 12 that hosts a telematics device 13 that connects to a peripheral device 36 through a cable 37 and serial interface 35. In this application, the peripheral device 36 is a LCD and keyboard mounted on the vehicle's dashboard 38. Once connected during an installation process, the peripheral device 36 transmits a numerical address through the cable 37 to the serial interface 35. A microprocessor in the telematics device interprets the address to recognize the peripheral device, and then begins to communicate.

The telematics device 13 may be installed under the vehicle's dash 38 and is not visible to the user. As described above, the telematics device 13 may connect to an OBD-II connector 34 in the vehicle 12 through a wiring harness 32, and is not in the driver's view. The OBD-II connector 34 powers the telematics device 13 and additionally provides a serial interface to the vehicle's engine computer. Through this interface the telematics device receives diagnostic information from the vehicle's OBD-II system, as is described in detail in the above-referenced patents, the contents of which have been incorporated by reference.

The telematics device 13 receives GPS signals from an antenna 21 mounted in a region, sometimes called the "A pillar", located proximal to the vehicle's windshield 41. These signals are interpreted by the device and converted into GPS information, e.g. latitude, longitude, altitude, speed, and heading, by a GPS module included in the telematics device. The telematics device transmits GPS and diagnostic information as separate packets through a radio antenna 33, located near the GPS antenna in the vehicle's A pillar, and to a wireless network (e.g., Cingular's Mobitex network). The radio antenna 33 is matched to a frequency supported by the wireless network (e.g., approximately 900 MHz for the Mobitex network). A cabling rig 39 connects both the radio 33 and GPS 21 antennae to the telematics device 13.

The LCD and keyboard, for example, are installed on a front portion of the dash 38 and below the windshield 41, and are positioned so that the driver can easily view messages on the display. Messages can be used for general fleet management, e.g., to notify a fleet manager that a job has been completed, or to schedule an appointment with a customer. In this case, the radio antenna 33 is additionally used to receive and transmit text messages through the wireless network.

Figure 4:
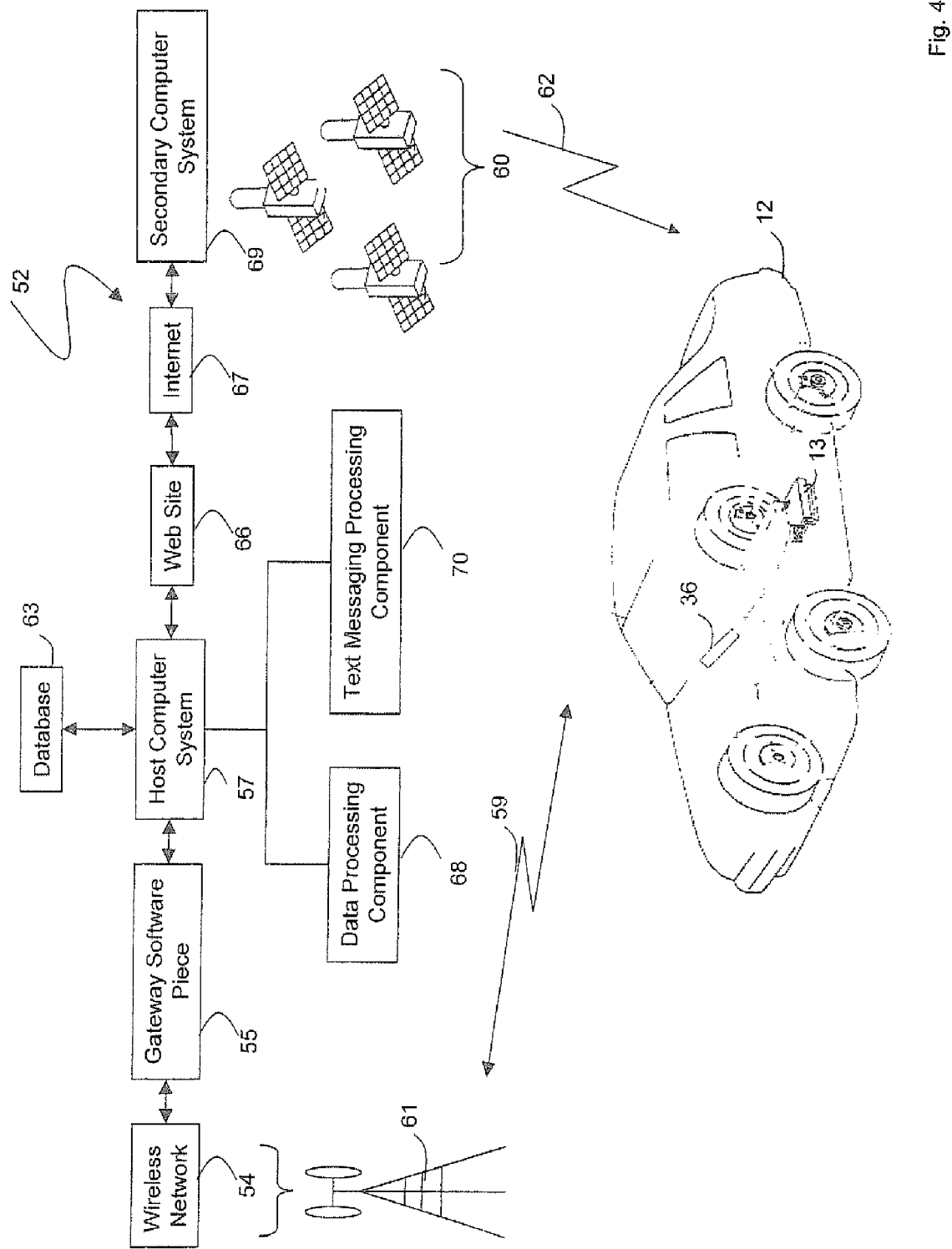
FIG. 4 is a schematic drawing of a vehicle featuring a wireless appliance that communicates with a GPS, a wireless communication network, and an Internet-accessible web site, according to one embodiment of the invention.

FIG. 4 of an embodiment shows a schematic drawing of a telematics system 52 that uses the above-described telematics device 13 to monitor diagnostic and location-based information, and a peripheral device 36 (e.g., an LCD and keyboard) to, for example, display text messages. A fleet manager would use this system, for example, to manage a collection of drivers. The telematics device 13 and peripheral device 36 are installed in a host vehicle 12 as described above. During operation, the telematics device 13 retrieves and formats diagnostic and GPS information and text messages in separate packets and transmits these packets over an airlink 59 to a base station 61 included in a wireless network 54. The packets propagate through the wireless network 54 to a gateway software piece 55 running on a host computer system 57. The host computer system processes and stores information from the packets in a database 63 using the gateway software piece 55. The host computer system 57 additionally hosts a web site 66 that, once accessed, displays the information. A user (e.g. an individual working for a call center) accesses the web site 66 with a secondary computer system 69 through the Internet 67. The host computer system 57 includes a data-processing component 68 that analyzes the location and diagnostic information as described in more detail below.

The host computer system 57 also includes a text messaging-processing component 70 that processes text messages as described in more detail below. Once received by the vehicle, the peripheral device (i.e. and LCD and keyboard) displays the messages for the driver, and additionally allows the driver to send messages back to the fleet manager.

Figure 5A:
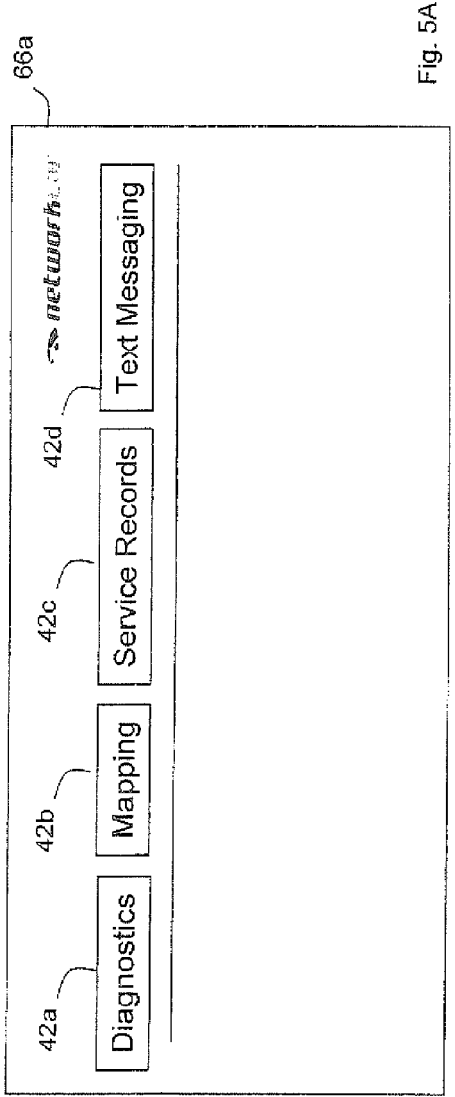
FIG. 5A is a semi-schematic drawing of an Internet-accessible web site featuring, respectively, tabs for information relating to diagnostics, location, service records, and text messaging, according to one embodiment of the invention.

FIG. 5A of an embodiment shows an Internet-accessible web page 66a that allows, e.g., a fleet manager to view GPS and diagnostic information, as well as text messages, for each vehicle in the fleet. The web page 66a connects to the text messaging-processing software component shown in FIG. 4. It would be used, for example, in combination with a vehicle featuring a telematics device and LCD/keyboard peripheral device, such as that shown in FIG. 3.

The web page 66a features tabs 42a-d that link to secondary web pages that display, respectively, vehicle diagnostic information, GPS information and mapping, service records, and text messaging. Each of these web pages is described in detail below.

Figure 5B:
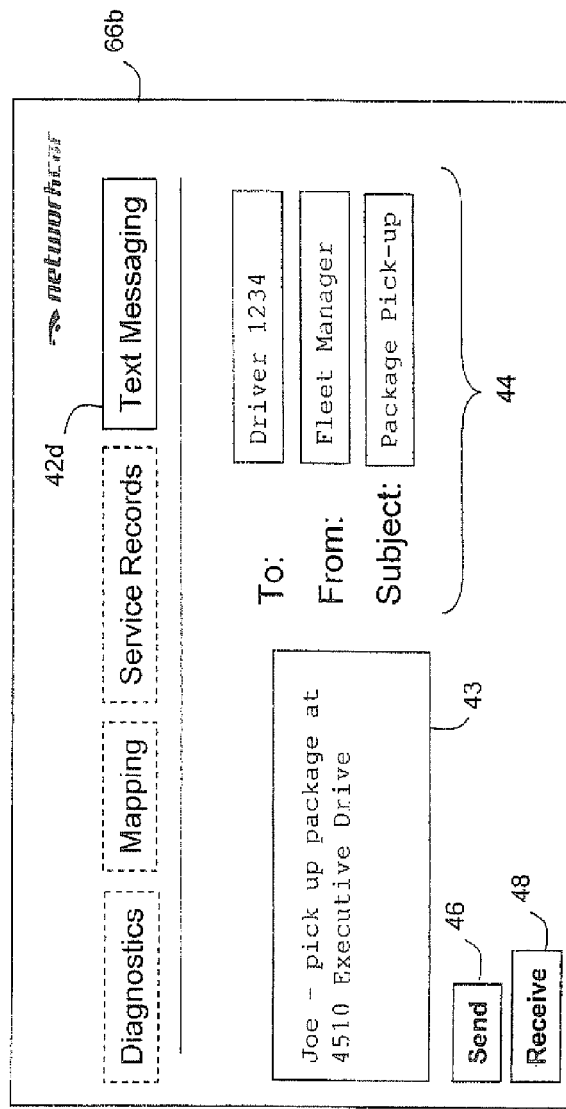
FIG. 5B is a semi-schematic drawing of an Internet-accessible web page that links to the web site of FIG. 5A and includes a user interface for sending and receiving text messages, according to one embodiment of the invention.

FIG. 5B of an embodiment, for example, shows a simplified web page 66b that renders when a user clicks the tab 42d labeled "Text Messaging" in the website shown in FIG. 5A. The web page 66b features a window 43 wherein the fleet manager can type in a text message that is then sent through the wireless network and displayed on an LCD for the driver of a particular vehicle. The web page 66b includes a field 44 that lists standard components of the text message, i.e. the destination of the text message, the sender, and the subject of the message. During operation, the fleet manager types the message in the window and wirelessly transmits it to the driver by clicking the "Send" button 46. Similarly, the fleet manager receives incoming text messages in the window 43 by clicking the "Receive" button 48.

The web page 66b shown in FIG. 5B may contain functionality that is consistent with state-of-the-art text messaging software. For example, these pages can link to additional web pages that include software systems for managing the text messages. These software systems include file-management systems for storing and managing incoming and outgoing messages; systems for sending messages to multiple vehicles in the fleet; systems for tracking the status of a message; systems for storing draft and standard, formatted messages (e.g., maps, directions, and standard responses); systems for sending standard messages; and systems for porting information from messages to other applications (using, e.g., Web Services software packages). Other message-processing systems are also within the scope of the invention.

Figure 6:
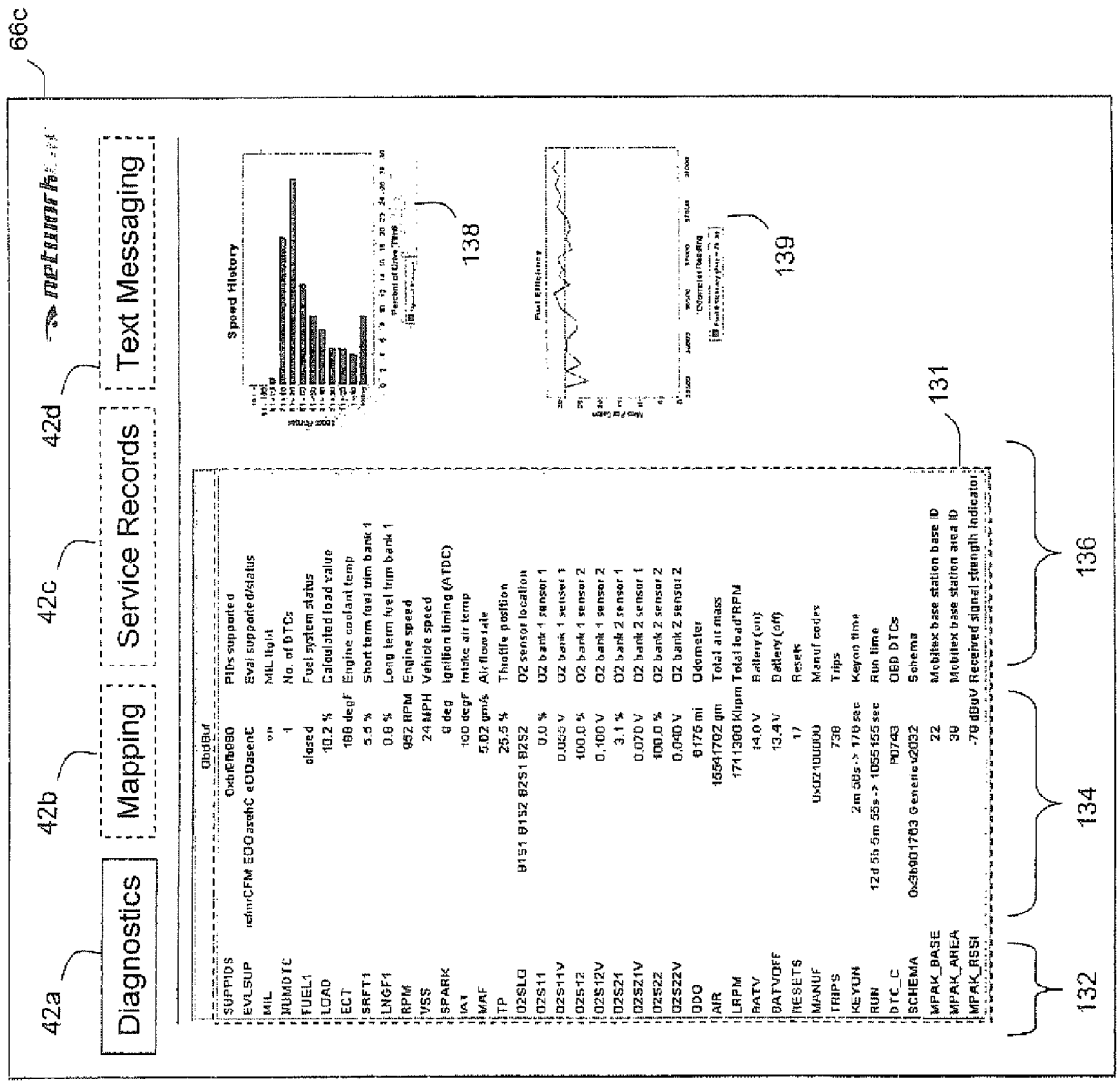
FIG. 6 is a semi-schematic drawing of an Internet-accessible web page that links to the web site of FIG. 5A and displays a vehicle's diagnostic data monitored by the telematics system of FIG. 1, according to one embodiment of the invention.

FIG. 6 of an embodiment shows a web page 66c that renders when a user clicks the "Diagnostics" tab 42a on the website shown in FIG. 5A. The web page 66c displays diagnostic data collected from the ECU of a particular vehicle as described above. The web page 66c includes a set of diagnostic data 131 and features fields listing an acronym 132, value and units 134, and brief description 136 for each datum. The web page 66c also includes graphs 138, 139 that plot selected diagnostic data in a time-dependent (graph 139) and histogram (graph 138) formats. Other methods for displaying and processing the diagnostic data are also within the scope of the invention.

During operation of an embodiment, the in-vehicle telematics device automatically transmits a set of diagnostic data 131 at a periodic interval, e.g. every 20 to 40 minutes. The telematics device can also transmit similar data sets at random time intervals in response to a query from the host computer system (sometimes called a "ping").

Detailed descriptions of these data, and how they can be further analyzed and displayed, are provided in the following patents, the contents of which are incorporated herein by reference: "Wireless Diagnostic System and Method for Monitoring Vehicles" (U.S. Pat. No. 6,636,790); and, "Internet-Based Vehicle-Diagnostic System" (U.S. Pat. No. 6,611,740).

Figure 7:
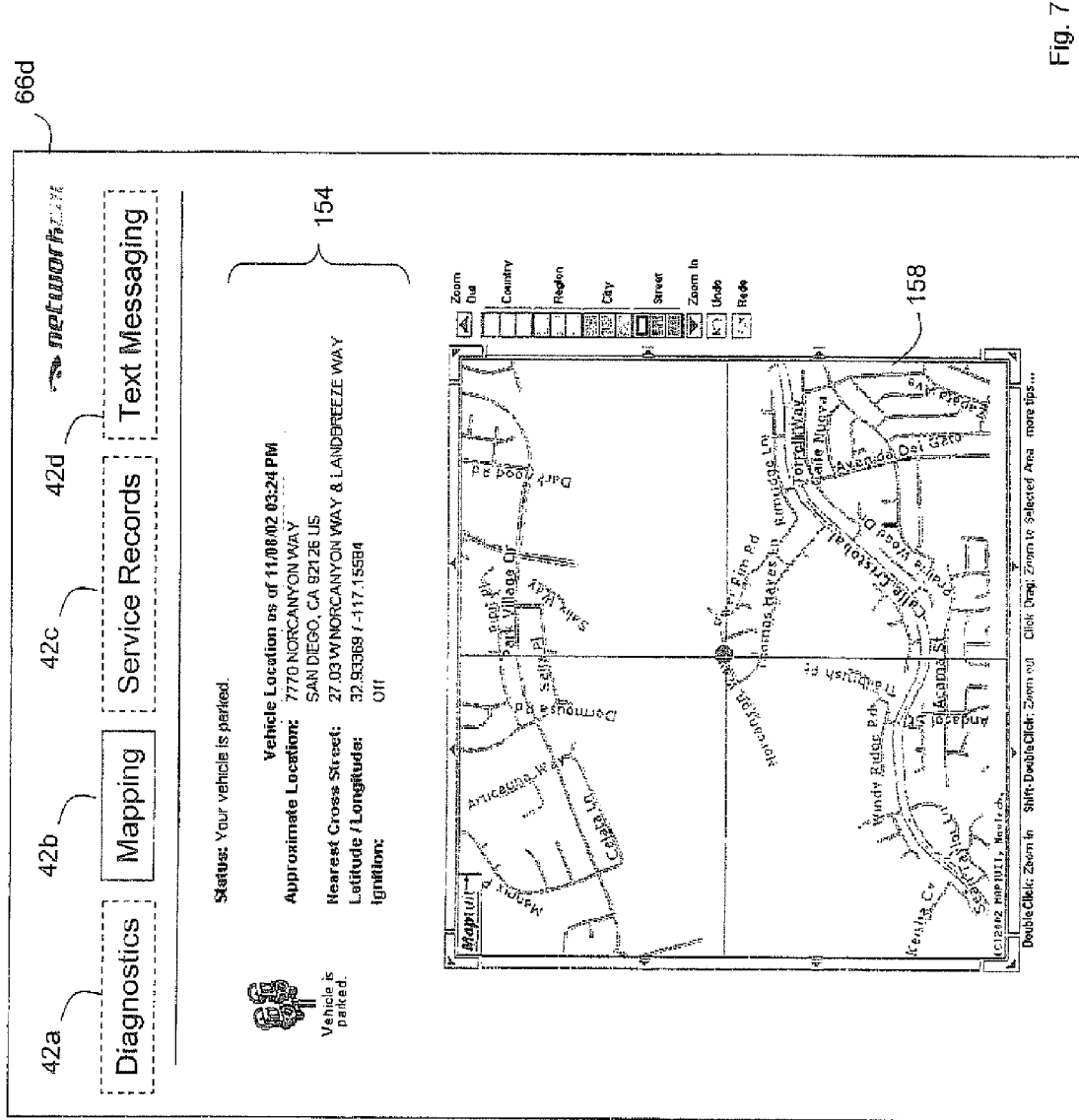
FIG. 7 is a semi-schematic drawing of an Internet-accessible web page that links to the web site of FIG. 5A and displays a vehicle's numerical latitude and longitude and a map showing the vehicle's location monitored by the telematics system of FIG. 1, according to one embodiment of the invention.

FIG. 7 of an embodiment shows a web page 66d that renders when a user clicks the "Mapping" tab 42b on the website shown in FIG. 5A. The web page 66d displays, respectively, GPS data 154 and a map 158 that together indicate a vehicle's location. In this case, the GPS data 154 include the time and date, the vehicle's latitude, longitude, a "reverse geocode" of these data indicating a corresponding street address, the nearest cross street, and a status of the vehicle's ignition (i.e., "on" or "off" and whether or not the vehicle is parked or moving). The map 158 displays these coordinates in a graphical form relative to an area of, in this case, a few square miles. In some embodiments, the web page 66d is rendered each time the GPS data are periodically transmitted from a vehicle (e.g., every 1-2 minutes) and received by the data-processing component of the website.

Both the map and a database that translates the latitude and longitude into a reverse geocode are hosted by an external computer server and are accessible though an Internet-based protocol, e.g. XML, Web Services, or TCP/IP. Companies such as MapTuit, MapQuest, and NavTech host software that provides maps and databases such as these. Methods for processing location-based data, taken alone or in combination with diagnostic data, are described in detail in the patent application "Wireless, Internet-Based System for Transmitting and Analyzing GPS Data" (U.S. Pat. No. 7,174,243), the contents of which are incorporated herein by reference.

FIG. 8 of an embodiment shows a web page 66e that renders when a user clicks the "Service Records" tab 42c on the website shown in FIG. 5A. The web page 66e displays, respectively, a list of service records 164 for a particular vehicle, and an individual service record 168 that describes a particular example of how the vehicle was repaired. The list of service record 164 shows: 1) the date of the service; 2) a work order number; and, 3) the company providing the service. In addition to this information, the individual service record 168 describes: 1) the type of service; 2) the mechanic that completed the service; 3) the cost of the service; 4) the mileage on the vehicle at the time of the service; and 5) a few comments describing the service.

To display service records like those shown in FIG. 8, the host computer system of an embodiment of the present invention may interface with a data-management system that runs of a computer system at an automotive dealership. Such a system, for example, is the ERA software system developed and marketed by Reynolds and Reynolds, based in Dayton, Ohio. Systems like ERA transfer service records to the host computer system through a variety of means. These include, for example, XML, XML-based Web Services, file transfer protocol (FTP), and email.

The web page can also show service records describing service performed by organizations other than an automotive dealership, e.g., by the vehicle owner or another entity (e.g., Jiffy Lube). These records may be entered by hand into a web page similar to that shown in FIG. 8.

Figure 9:
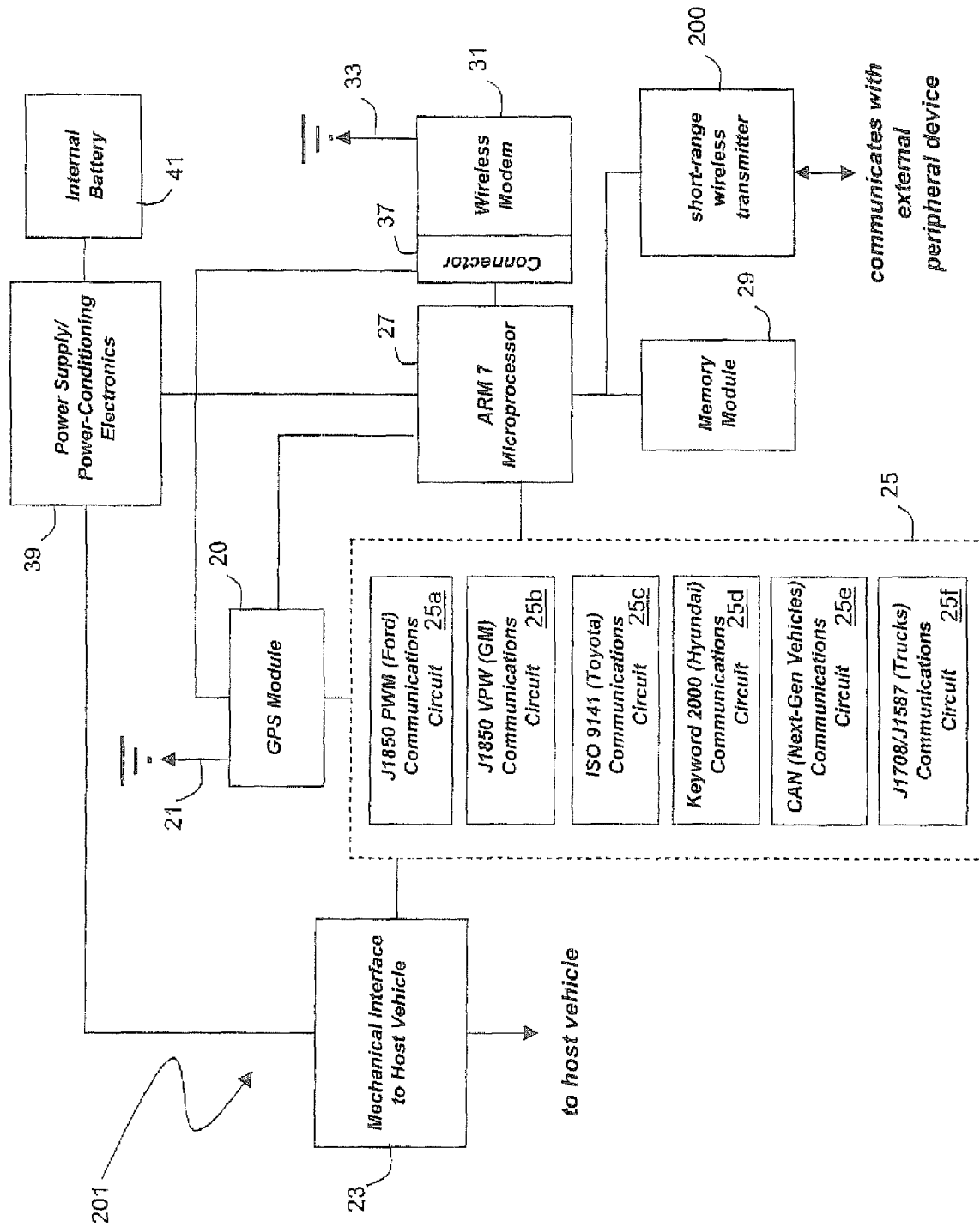
FIG. 9 is a schematic drawing of the in-vehicle telematics device featuring a wireless modem, GPS, vehicle-communication circuits, and a short-range wireless transmitter, according to one embodiment of the present invention.
Figure 10:
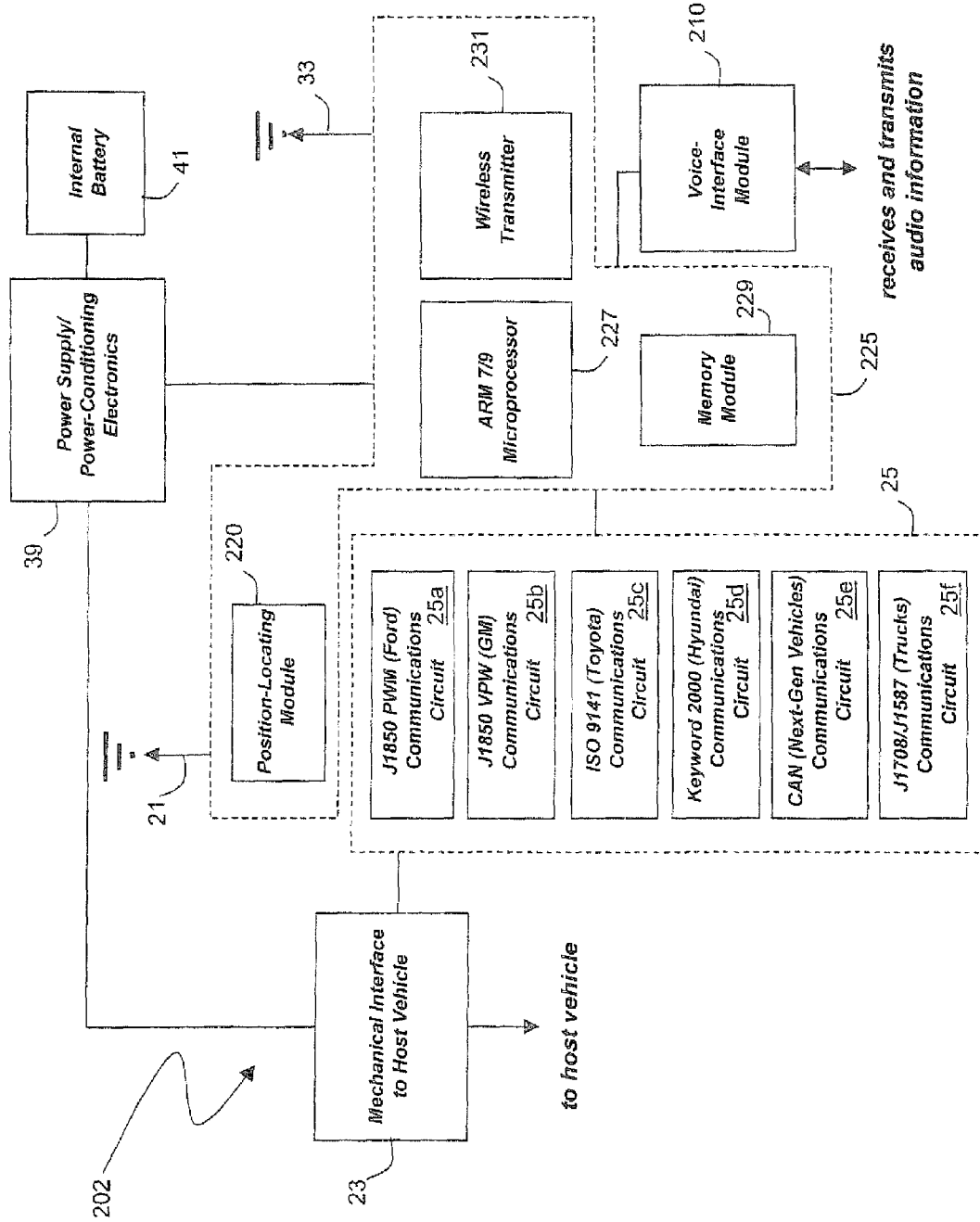
FIG. 10 is a schematic drawing of the in-vehicle telematics device featuring a single chipset-based that includes a wireless transmitter, position-locating module, memory, and a microprocessor, vehicle-communication circuits, and a voice interface for transmitting audio information, according to one embodiment of the present invention.

FIGS. 9 and 10 describe alternate embodiments of the invention. These embodiments are based on the telematics device shown in FIG. 1, but include additional hardware components that add functionality to the device. For example, FIG. 9 shows a telematics device 201, similar to the device shown in FIG. 1, which additionally includes a short-range wireless transmitter 200 that sends diagnostic, location, and other information to a remote receiver. The short-range wireless transmitter 200 can be a stand-alone module that attaches to the same circuit board used to support all the components shown in FIG. 9. The remote receiver can be one of the external peripheral devices (such as a display) shown above, or can be a device such as an automotive scan tool, computer system, cellular phone, or PDA. The short-range wireless transmitter 200 may be a high-bandwidth transmitter, e.g., a transmitter using Bluetooth® or 802.11b technology. Alternatively, the short-range wireless transmitter can be a low-bandwidth transmitter, e.g. a transmitter using part-15, infrared, or other optical technology.

FIG. 10 shows alternate embodiments of the telematics device 202 featuring a single chipset 225 that performs multiple functions. The chipset 225, for example, includes a wireless transmitter 231, an ARM microprocessor 227 (which may be an ARM7 or ARM9), a memory module 229, and a position-locating module 220. Each of these components is integrated directly into silicon-based systems on the chipset 225. The components connect to each other through metallization layers in the chipset 225. In addition, the chipset 225 connects to a voice-interface module 210 (e.g., a hands-free interface, including a microphone and a speaker) that receives audio input (e.g. a user's voice) and sends this through the chipset 225 to the wireless transmitter 231 for transmission.

The chipset 225 often runs firmware, stored in the memory module 229 and run on the microprocessor 227, that performs simple voice recognition so that a user can initiate a call, search for and dial a telephone number, and then end a call, all without touching the device. In this capacity the telematics device 202 operates like a cellular telephone integrated with a hands-free phone kit. The wireless transmitter 231 may therefore include a high-bandwidth transmitter, e.g., a transmitter that operates on a CDMA or GSM network. Chipsets such as those manufactured by Qualcomm, e.g., the MSM6025, MSM6050, and the MSM6500, include such wireless transmitters, and can therefore be used in the present invention. The MSM6025 and MSM6050 chipsets operate on both CDMA cellular and CDMA PCS wireless networks, while the MSM6500 operates on these networks and GSM wireless networks. In addition to circuit-switched voice calls, the wireless transmitter 231 can transmit data in the form of packets at speeds up to 307 kbps in mobile environments.

The chipset 225 shown in FIG. 10 determines a location of the host vehicle using the position-locating module 220. In particular, the chipsets described herein may use a position-locating technology developed by Qualcomm called Snap Track/GPSone™, which operates a "network assisted" GPS technology. Snap Track/GPSone™ operates by collecting GPS signals from overlying satellites (like a conventional GPS) and radio signals transmitted from an individual wireless transmitter and base stations (which have known, stationary locations) included in a cellular or PCS wireless network. This information is sent to a position determining entity ("PDE"), which may be typically located in the wireless network and processes the information to calculate an accurate location (e.g., latitude, longitude, and altitude) of the wireless transmitter. Once this information is calculated, the PDE and sends the position back to the wireless transmitter, where the telematics device processes it as described above.

In addition to the above described functions, the chipsets may include modules that support the following applications: playing music and video recordings; recording and replaying audio information; processing images from digital cameras; playing video games; and driving color and black-and-white displays. Each of these applications can be therefore integrated into the various telematics devices and systems described herein.

Figure 11:
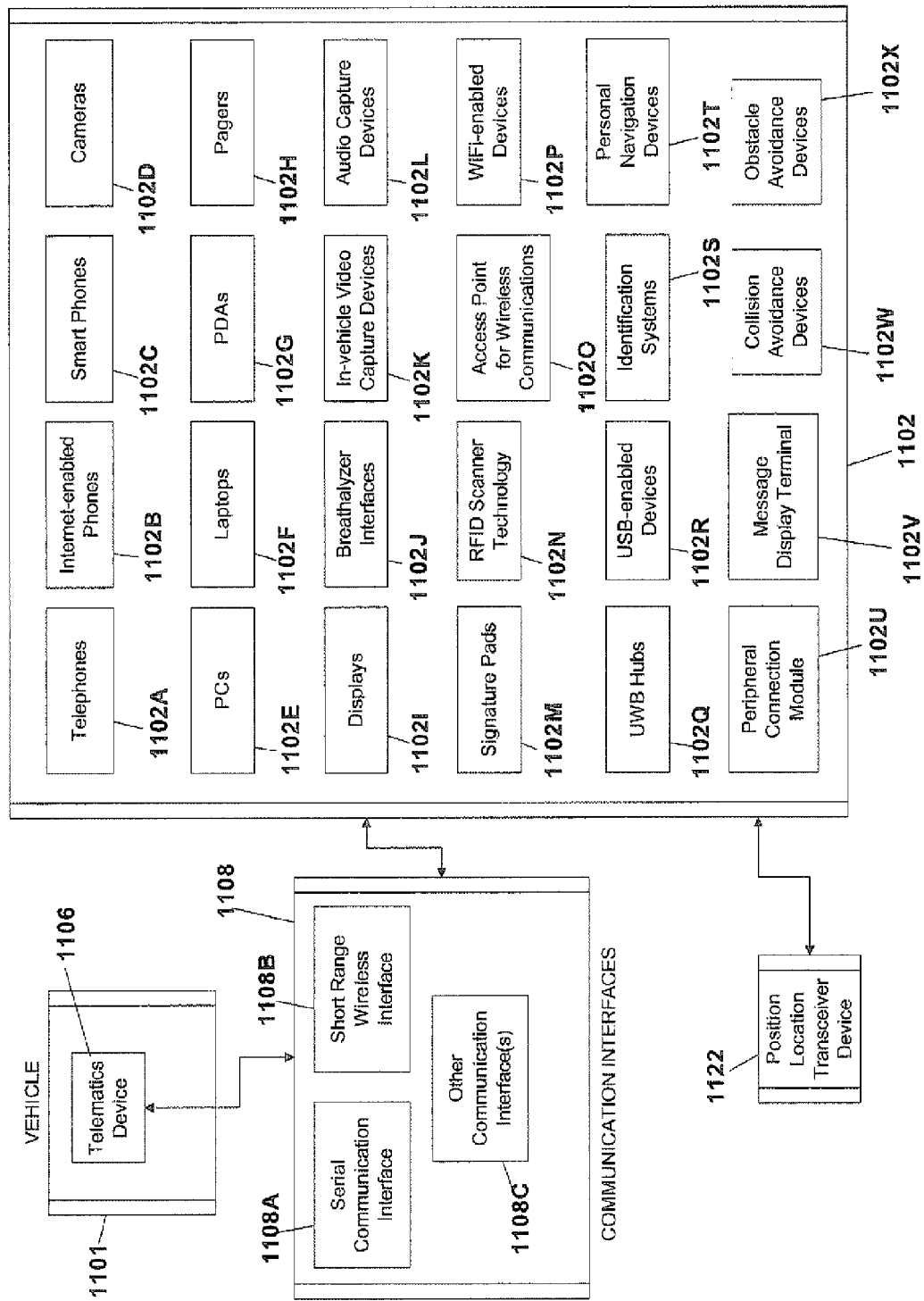
FIG. 11 is a schematic system architecture illustrating various examples of access devices that may communicate with a telematics device in accordance with embodiments of the invention.
Figure 12:
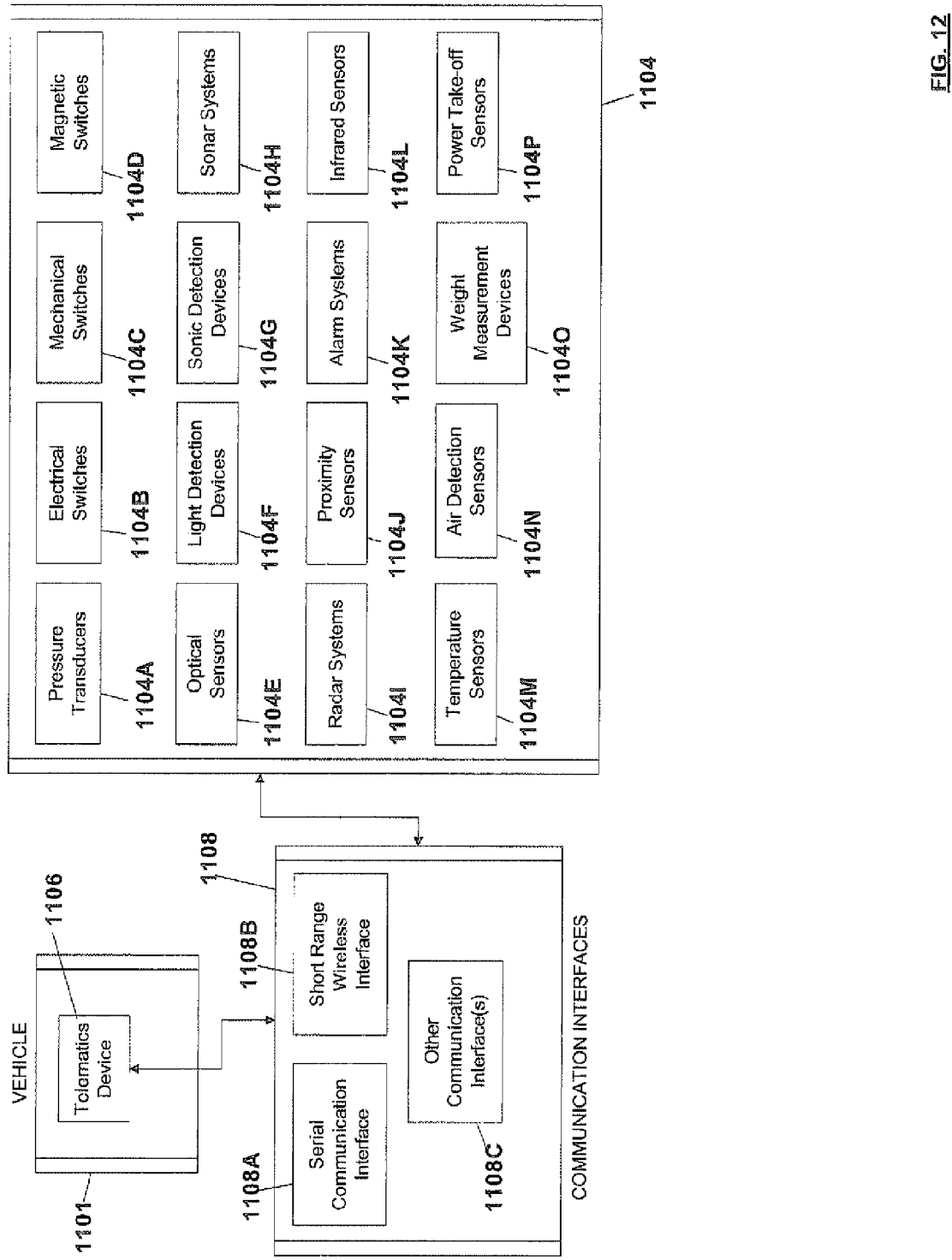
FIG. 12 is a schematic system architecture illustrating various examples of sensors that may communicate with a telematics device in accordance with embodiments of the invention.

In various embodiments, and with general reference to FIGS. 11 and 12, one or more types of access devices 1102 and/or one or more types of sensors 1104 may be employed in operative association with one or more vehicle 1101 telematics devices and/or systems 1106, examples of which are described herein. The access devices 1102 may be used as external peripheral devices which are configured for communication with the telematics device 1106 through one or more different types of communication interfaces 1108. Examples of the communication interfaces 1108 include a serial communication interface 1108A (e.g., $I^2C$, RS232, RS422, RS485, USB, CAN, SPI, or others), a short range wireless interface 1108B (e.g., transceivers using "Bluetooth®" technology, 802.11a/b/g standard communications, 802.24 standard communications, 802.32 standard communications, "ZigBee" technology, and/or "Wi-Fi" technology, among many others), and/or other communication interfaces 1108C (e.g., parallel port) suitable for sending or receiving data between the access devices 1102 and the telematics device 1106.

As discussed in more detail herein, data communicated between the telematics device 1106 and the access devices 1102 and/or the sensors 1104 may be used to control functions of the devices 1102, 1106 or the vehicle 1101; retrieve or store data; report a detected behavior, condition or characteristic of a device, system, machine, or implement; and/or for a variety of other purposes. In various embodiments, the access devices 1102 and/or sensors 1104 may be equipped or configured for wireless communication, wireline communication, or may have a combination of wireless/wireline capabilities.

In various embodiments, the access devices 1102 and/or sensors 1104 described herein may be installed by an original equipment manufacturer ("OEM"), such as during production of a vehicle 1101, for example, or during initial installation of a telematics device 1106 into the vehicle 1101. Thus, the access devices 1102 and/or sensors 1104 may be installed in operative association with the vehicle 1101 as original equipment manufacturer components. In certain embodiments, the access devices 1102 and/or sensors 1104 described herein may be installed or used in association with the telematics device 1106 in an "after market" setting, such as after a vehicle 1101 has been produced and deployed for a period of time. For example, access devices 1102 and/or sensors 1104 may be installed as after market components on a fleet of vehicles 1101, such as a group of school buses, a fleet of tanker trucks used to transport goods, or a fleet L of rental vehicles.

As shown, the access devices 1102 may include, for example and without limitation: telephones (e.g., wireless phones, wireline phones, cellular phones) 1102A; Internet-enabled phones 1102B; smart phones 1102C; cameras 1102D (e.g., video cameras, digital cameras, web-enabled cameras, Internet protocol video cameras, digital video cameras (still and motion) for obtaining real-time images, camcorders, etc.), personal computer systems 1102E, laptops 1102F, personal digital assistants (PDAs) 1102G, pagers 1102H, displays 1102I (e.g., LCD displays), and/or a variety of other access, display or control devices which can be configured for communication with the telematics device 1106.

Other examples of access devices 1102 that may be configured to interface or communicate with the telematics device 1106 include breathalyzer interfaces 1102J; interfaces to in-vehicle video capture devices 1102K, such as may be used by various law enforcement entities; audio capture devices 1102L (e.g., microphone input); signature pads 1102M for electronic signature capture; active and/or passive RFID scanner technology 1102N; access point or interface for wireless communications 1102O (e.g., 802.11 "hotspot"); WiFi cameras, telephones, handsets, or other WiFi-enabled devices 1102P; ultra-wide-band ("UWB") hubs 1102Q; USB cameras, telephones, handsets (audio), or other USB-enabled devices 1102R; identification systems 1102S including card swipe functionality, keypad, biometrics, or barcode readers, such as for identifying or recording vehicle 1101 drivers, cargo contents, deliveries, service calls, and/or other events; collision avoidance devices 1102W; obstacle avoidance devices 1102X; and/or a variety of other suitable types of access devices 1102.

It can be appreciated that the access device 1102 may be any device or appliance that provides one or more of a graphical component, a keyboard, a terminal, or other functionality that permits access to and communication with the telematics device 1106 in the vehicle 1101. The access device 1102, through the communication interface 1108 acting as a bridge, may be used to tap into the existing computing power, data collection capabilities, and/or connectivity functionality of the telematics device 1106.

In certain embodiments, one or more of the access devices 1102 may be configured for voice-over-Internet-protocol ("VoIP") communications through an Internet, HTTP protocol, or other type of networked medium communication connection established through the telematics device 1106. For example, a cellular phone 1102A may be used to place a VoIP call through wireless communication with the telematics device 1106 through the short range wireless interface 1108B. In another example, a handset for a wireline phone 1102A may be electrically wired and/or mechanically connected to the telematics device 1106 to enable VoIP communications through the serial communication interface 1108A. For example, a USB voice handset of an Internet-enabled phone 1102B may be configured to communicate with a router in the telematics device 1106 and establish a VoIP connection with a phone call recipient through a modem connection of the device 1106. In a like manner, VoIP communications may be received by the telematics device 1106 from a caller outside of the vehicle 1101 and forwarded to a user employing a cellular phone 1102A in the vehicle 1101, for example.

It can be seen that the capability for such VoIP or telephony communications may be provided through the existing Internet or network connection of the telematics device 1106 (e.g., modem connection) and power supplied by the vehicle 1101 in which the telematics device 1104 is installed. In certain embodiments, functions normally performed by the microphone or audio speaker of an access device 1102 may be routed to functionally analogous components within the vehicle 1101. For example, a user may employ a wireless phone 1102A to place a telephony-enabled call through the telematics device 1106, and may use audio speakers within the vehicle 1101 to listen to the recipient of the call. Where appropriate and operationally possible, various functions of the access devices 1102 may be assigned to or performed by functionally analogous devices or components in the vehicle 1101, or by other devices or peripherals connected to the telematics device 1106.

In various embodiments, telephone communications may be forwarded or routed through and by the telematics device 1106 to the access device 1102 (e.g., a wireless phone 1102A). In such embodiments, the communication capability of the telematics device 1106 can place, connect, and/or terminate telephone calls, and the access device 1102 can be configured to operate as a "dumb" terminal for receiving telephone communications. For example, a telephone communication may be facilitated by using a voice channel in the telematics device 1106 which sends the communications back to a voice handset functioning as a dumb terminal. Also, the telematics device 1106 may leverage the antenna, speakers, or other devices in the vehicle 1101 to assist with transmitting and/or receiving such communications.

The benefits of enabling and facilitating VoIP communications through the telematics device 1106 can be appreciated especially in those situations in which a user does not have access to a separate cellular phone 1102A, for example, or otherwise cannot establish communications outside of the vehicle 1101 independently of the operation of the telematics device 1106. Using an existing access device 1102 of a user realizes the benefits of using prestored or previously known information associated with the device 1102 or the user (e.g., others already know the user's telephone number, phone numbers are stored in the telephone, etc.).

In various embodiments, the telematics device 1106 may be configured to transmit position location information (e.g., GPS data) to one or more of the access devices 1102, including access devices 1102 with little or no existing position location functions. In certain embodiments, the access device 1102 (e.g., a wireless phone 1102A) may be operatively associated with a position location transceiver device 1122, which is capable of receiving and processing communicated position location data. The position location device 1122 may be embodied as a module or chip that can be operatively connected to the access device 1102 and configured to function as both a GPS receiver (i.e., for receiving position location information from the telematics device 1104) and a short range wireless transceiver (i.e., for enabling communications such as "Bluetooth®" transmissions with the access device 1102). The position location device 1122 may be configured to interact with a suitable navigation software application, for example, that can be downloaded and stored on the access device 1102 to process position location data communicated by the position location device 1122.

It can be seen that the access device 1102 may be effectively converted into a personal navigation device ("PND") 1102T for the user. In certain embodiments, the PND 1102T may include one or more maps or other geographical representations stored thereon to provide turn-by-turn navigational functionality for a user. Such maps and geographical representations may be downloaded and stored on the PND 1102T through a network connection with the telematics device 1106, for example, or by retrieving information stored on a secure digital ("SD") card. In one example of its operation, the PND 1102T may receive position location data communicated by the telematics device 1106, for example, and/or from another source of position location data, via the position location device 1102T. In connection with the navigation software application, and possibly one or more maps stored on the PND 1102T, the PND 1102T may employ a speaker phone capability to announce turn-by-turn navigational directions to a user in the vehicle 1101 (e.g., "turn right in 500 yards", "turn right now", etc.).

In various embodiments, one or more types of access devices 1102 can be configured to work in cooperation with the telematics device 1106 to perform various functions in association with different operational features of the vehicle 1101. For example, a smart phone 1102C may be configured with a software application that allows a user to direct the telematics device 1106 to open or close the windows of the vehicle 1101; to lock or unlock the vehicle 1101; and/or, to initiate ignition on or off for the vehicle 1101. As described above, commands communicated from the access device 1102 to the telematics device 1106 may be effected through the short range wireless interface 1108B, for example. In such embodiments, it can be seen that the access device 1102 initiates communication with the telematics device 1106 to issue commands regarding operations or functions to be performed by the vehicle 1101.

Examples of other operations or functions of the vehicle 1101 that can be performed include, without limitation: turn on or off an air conditioning system; initiate or stop a panic alarm; turn on or off interior or exterior lights; perform functions that might otherwise be provided in association with a remote key device for the vehicle 1101, such as remotely turning the vehicle 1101 engine on or off; turn on or off electric seat warmers, window defrosters, or other creature comfort systems; and/or, detect vehicle settings, such as what transmission gear is currently selected for the vehicle 1101.

In another example, an alarm system 1104K installed in the vehicle 1101 may be operated (as a sensor 1104K, for example) by using the access device 1102 to communicate with the telematics device 1106 to issue commands that arm, disarm, activate, deactivate, or perform other functions for the alarm system 1104K. In addition, the access device 1102 working in operative connection with the alarm system 1104K can be configured to communicate or display status information such as whether the alarm system 1104K is currently armed or disarmed, activated or not activated. The alarm system 1104K may also include one or more sensors (e.g., infrared, sonar, optical sensors, etc.) configured to detect the presence or absence of a human, animal or other object or organism in the vehicle 1101, such as a human intruder waiting to highjack the vehicle 1101 once the owner returns and enters the vehicle 1101, for example. The alarm system 1104K may be configured to communicate information indicative of the presence or absence of such organisms or objects to the access device 1102, for example, to alert a user of their presence or absence.

It can be appreciated that communications between the access device 1102 and the telematics device 1106 may be encoded, secured, and/or verified on a one-way or two-way basis to promote ensuring that communications are valid. In addition, applications executed by the access device 1102 may be password-protected to restrict access to only certified users. In certain embodiments, the access device 1102 or the telematics device 1106 may automatically initiate a verification check once the devices 1102, 1106 are sufficiently close in proximity to initiate effective short range wireless communications. The verification check may include comparing an identification number, security device, or token of the access device 1102 against an identification number, security device or token of the telematics device 1106 to confirm that the user is permitted to direct the features or functions of the vehicle 1101.

In one example of the operation and use of the access device 1102, a software application may be provided in association with the device 1102 that directs the vehicle 1101 to start or stop automatically every morning at a predetermined time on one or more predetermined days (e.g., business days such as Monday through Friday). In addition, the telematics device 1106 may be configured to initiate communications with the access device 1102 after a function has been started or completed. For example, once the access device 1102 communicates with the telematics device 1106 to start the vehicle 1101 in the morning, the telematics device 1106 may return a communication to the access device 1102 to confirm that the engine of the vehicle 1101 has been started. The telematics device 1106 may also initiate such confirmation communications through its own wireless modem or other network connection.

In various embodiments, the access device 1102 may be employed to retrieve current or historical data or other information stored by the telematics device 1106. Such data may include, for example, miles per gallon information or a maximum speed achieved within a given time period. In another example, the telematics device 1106 may be configured to permit a user to download a histogram for the most recent trip taken for a vehicle, including a record (e.g., histogram) of every speed that has been attained by the vehicle in the last day, week, month, year, or other time period. In general, any information or data regarding an operational feature, function, or reported malfunction that can be retrieved or stored by the telematics device 1106 can be communicated to the access device 1102. Data or information retrieved from the telematics device 1106 may be stored and/or displayed on the access device 1102. It can be seen that the access device 1102 may be employed as a diagnostic scan tool, for example, in association with receiving, storing, and/or displaying data communicated by the telematics device 1106.

In various embodiments, the access device 1102 may include a general purpose analog or digital I/O peripheral connection module 1102U structured for serial communications (e.g., through DB9, DB25 or USB cables) or parallel data communication. For example, the connection module 1102U may be embodied as a set of screw terminals that allow a user to employ a variety of different kinds of cables, wires, terminals, or other connectors to connect a system, device or appliance to the telematics device 1106. The connection module 1102U thus enables a variety of custom analog or digital applications, devices or systems to be connected for communication of data, information and/or signals with the telematics device 1106.

In various embodiments, the access device 1102 may be embodied as a message display terminal or mobile data terminal ("MDT") 1102V which is configured to receive and display data communicated from the telematics device 1106. The MDT 1102V may be a screen display, for example, associated with a telephone, a PDA, a laptop, or another type of access device 1102 having a graphical component. In certain embodiments, the MDT 1102V may be a hardware device which is a one-way display, for example. The MDT 1102V may be electroluminescent and/or include an LCD display.

In various embodiments, a first access device 1102 may serve as an intermediary for communication of data or information to a second access device 1102 or other access devices 1102. For example, an LCD display 1102I connected to the telematics device 1106 may be configured to send substantially identical display information for presentation on the smart phone 1102C of a user, wherein the smart phone 1102C can be configured to receive the display information from the LCD display 1102I.

The access device 1102 and telematics device 1106 may also be configured to enable access through the wireless modem or network communication connection of the telematics device 1106, such as to retrieve diagnostic information from a website or web server for display to a user, for example. It can be seen that such embodiments effectively couple a short range wireless communication 1108B between the devices 1102, 1106 with a network medium connection (e.g., Internet or intranet connection) initiated by the telematics device 1106.

In various embodiments, the telematics device 1106 may be configured for communication with one or more sensors 1104 installed on, within, or in association with the vehicle 1101. For example, the sensors 1104 may include, without limitation, pressure transducers 1104A, electrical switches 1104B, mechanical switches 1104C, magnetic switches 1104D, optical sensors 1104E, light detection devices 1104F, sonic detection devices 1104G, sonar systems 1104H, radar systems 1104I, proximity sensors 1104J (e.g., for promoting collision avoidance and/or obstacle avoidance), alarm systems 1104K, infrared sensors 1104L, temperature sensors 1104M, air detection sensors 1104N (e.g., for monitoring tail-pipe emissions), or weight measurement devices 1104O. As with the access devices 1102 described above, the sensors 1104 and the telematics device 1106 may be configured for short range wireless communication 1108B, for example, to exchange data or other information. The telematics device 1106 may be configured to trigger an action automatically in connection with operation of the sensors 1104. Such triggered actions may include, for example, one or more of storing data, communicating data, notifying a user of an event (e.g., triggering an alarm), and/or issuing a command or instructions to another device or system.

For example, a temperature sensor 1104M may be placed in a refrigerated truck 1101 to detect temperature in the storage portion of the truck 1101. Temperature data may collected, stored, and/or analyzed at different times or trip milestones for the truck 1101 throughout its trip to ensure that stored food products, for example, do not thaw, spoil or become susceptible to salmonella, bacteria, or other pathogens. In operation, temperature data can be detected by the temperature sensor 1104M and communicated to the telematics device 1106. The telematics device 1106 may store or report the temperature data for further processing by the driver, owner and/or fleet manager for the truck 1101. If the temperature data are outside of a predetermined acceptable range or limit, for example, then an alert or other notification can be generated to communicate the temperature condition in the storage area of the truck 1101. For example, a food carrier may identify a problem if the refrigerator in the truck 1101 is normally at 20 degrees and then rises to 30 degrees. In this example, the food has not yet spoiled, and there may be sufficient time to send another truck to rendezvous with the first truck 1101 and exchange the truckload.

In another example, the vehicle 1101 can be provided with a power take-off ("PTO") sensor 1104P to detect activation, engagement or other use of a variety of PTO implements. For example, the PTO sensor 1104P may be attached to drill bits, winches, cranes, lifts, shafts, gear drives, spades, buckets, cutting implements, digging implements, earth-moving implements, boring implements, mowers, high-rangers or mechanical arms, dumping implements, mixing implements, fire containment or extinguishing equipment (e.g., water hoses on a fire truck), and/or any other device or system that at least partly employs PTO power to function. In general, any component of a vehicle 1101 that derives or takes-off mechanical power from a main shaft of the vehicle 1101 can be considered a PTO implement. For example, a tractor may be used to mow tracts of grasslands by engaging a PTO shaft to activate the mower cutting blades. The engine of a car may be used, for example, to operate a winch to tow a boat behind the car. The PTO sensor 1104P may detect and communicate data indicative of when the PTO implement is activated, deactivated, and/or operating at less or more than a nominal level. The PTO sensor 1104P may also be configured to detect operating conditions of the PTO implement, such as speed of rotation, duration of use, time of use, and/or location of use, among others.

It can be seen that the various sensors 1104 described herein may be used to detect unauthorized vehicle 1101 access or use. For example, suppose a tractor owned by a utility company is equipped with a mower implement designed for mowing grass and is also equipped with the PTO sensor 1104P. The utility company may detect unauthorized use of the mower if the PTO sensor 1104P senses a shaft turning at a time outside of regular business hours, for example, or at a location not scheduled for mowing activity (e.g., the home of an employee). The PTO sensor 1104P may also be associated with operator identification, such that some operators may be authorized to use certain equipment but not other equipment. For example, driver A may be qualified to drive the vehicle 1101 and use a PTO implement, but driver B may be qualified only to drive the vehicle 1101. Thus, a notification of PTO activation provided by the PTO sensor 1104P through the telematics device 1106 may indicate that an operator has improperly engaged a PTO implement.

In another example, a sonic detector 1104G may be configured to monitor cargo in a container or other storage area of a vehicle 1101. The sonic detector 1104G may be configured to monitor whether load shifting is occurring in a pallet of boxes on a truck. In operation, the sonic detector 1104G may be configured to periodically or repeatedly transmit sound waves to the cargo, and receive reflected sound waves therefrom, to determine if the mass of the cargo has shifted in the storage area. An excessive amount of shift may be reported to the cargo transporter, for example, through communication of the shift indication data from the sonic detector 1104G through the telematics device 1106.

In another example, a school bus 1101 may employ yellow or red flashers, for example, to notify other drivers on the road that students are preparing to board or exit the bus 1101. An optical sensor 1104E may be employed on the bus 1101 to detect whether or not the bus 1101 operator has properly engaged the flashers at a stop. For example, the telematics device 1106 may detect when the bus 1101 is in park with the engine running, or may check GPS data to confirm that the bus 1101 is at or near a scheduled stop. In association with these detected conditions, the optical sensor 1104E may report data to the telematics device 1106 indicative of whether or not the flashers of the bus 1101 have also been engaged.

Other embodiments are also within the scope of the invention. In particular, hardware architectures other than that described above can be used for the telematics device. For example, the ARM7 microprocessor used to run the appliance's firmware could be contained within the GPS module. Or a different microprocessor may be used. Similarly, serial protocols other than I$^2$C can be used to communicate with the peripheral devices. These may include USB, CAN, RS485, and/or SPI, for example, among others.

Web pages used to display the data can take many different forms, as can the manner in which the data are displayed, the nature and format of the data, and the computer code used to generate the web pages. In addition, web pages may also be formatted using standard wireless access protocols (WAP) so that they can be accessed using wireless devices such as cellular telephones, personal digital assistants (PDAs), and related devices. In addition, these devices can display text messages sent using the above-described system. In still other embodiments, the above-described system is used to locate vehicle or things other than cars and trucks, such as industrial equipment or shipping containers.

In general, it will be apparent to one of ordinary skill in the art that some of the embodiments as described hereinabove may be implemented in many different embodiments of software, firmware, and hardware in the entities illustrated in the Figures. The actual software code or specialized control hardware used to implement some of the present embodiments is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

It can be appreciated, for example, that some process aspects described herein may be performed, in certain embodiments, using instructions stored on a computer-readable medium or media that direct a computer system to perform the process aspects. A computer-readable medium can include, for example, memory devices such as diskettes, compact discs of both read-only and read/write varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

It is to be understood that the figures and descriptions of the embodiments of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In certain embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

The foregoing description refers to the accompanying drawings that illustrate certain exemplary embodiments of the invention. Those skilled in the art will appreciate that other embodiments of the invention are possible and modifications may be made to the embodiments without departing from the spirit and scope of the invention. Therefore, the examples and illustrations presented in the foregoing detailed description are not necessarily meant to limit the present invention. Rather, the scope of the invention is defined by the appended claims.

What is claimed is:

1. A method, comprising:
    interfacing an access device and a telematics device with a communication interface;
    receiving diagnostic information from a host vehicle;
    receiving information from the access device, and
    transmitting the diagnostic information and the information received from the access device with the diagnostic device over a wireless network to at least one Internet-accessible website.

2. The method of claim 1 wherein the access device comprises a speaker and a microphone.

3. The method of claim 1 wherein the communication interface is a Bluetooth® link.

4. The method of claim 1 wherein the communication interface is an 802.11b link.

5. The method of claim 1 wherein the information received from the access device includes a distress signal input generated from a panic button.

6. The method of claim 1 further comprising transmitting an emergency message that includes the location of the host vehicle and at least a portion of the diagnostic information with the access device through the wireless network to a host computer system in response to receiving a distress signal.

7. The method of claim 2 further comprising transmitting voice signals received from the microphone of the access device and audibly playing voice signals received by the telematics device with the speakers.

8. A method, comprising:
    interfacing an access device and a telematics device over a communication interface that includes a short range wireless interface;
    requesting diagnostic information from a host vehicle over the short range wireless interface;
    receiving the requested diagnostic information from the host vehicle; and
    transmitting the diagnostic information with the access device over a wireless network to at least one Internet-accessible website.

9. The method of claim 8 wherein the access device is a smart phone.

10. The method of claim 8 wherein the interfacing occurs over a Bluetooth® link.

11. The method of claim 8 wherein the interfacing occurs over an 802.11b link.

12. The method of claim 8 further comprising:
    receiving a distress signal input generated from a panic button; and
    transmitting an emergency message that includes the location of the host vehicle and at least a portion of the diagnostic information with the access device through the wireless network to a host computer system in response to receiving the distress signal.

13. The method of claim 8 further comprising performing telematics device features and operations with the access device.

14. The method of claim 13 wherein the access device includes one or more software modules for performing the telematics features.

15. A system, comprising:
    an access device configured to interface with a diagnostic system over a communication interface that includes a short range wireless interface;
    wherein the access device is configured for receiving diagnostic information from a host vehicle; and
    wherein the access device is configured for transmitting the diagnostic information over a wireless network to at least one Internet-accessible website.

16. The system of claim 15 wherein the access device is a smart phone.

17. The system of claim 15 wherein the access device is configured to perform the interfacing over a Bluetooth® link.

18. The system of claim 15 wherein the access device is configured to perform the interfacing over an 802.11b link.

19. The system of claim 15 wherein the access device is configured for receiving a distress signal input generated from a panic button; and
    wherein the access device is configured for transmitting an emergency message that includes the location of the host vehicle and at least a portion of the diagnostic information with the access device through the wireless network to a host computer system in response to receiving the distress signal.

20. The system of claim 15 wherein the access device is configured for performing telematics device features and operations.

* * * * *